Aug. 7, 1934.  N. B. JOHNSON  1,969,080
LIQUID FUEL HEATING SYSTEM
Filed July 16, 1926   3 Sheets-Sheet 1
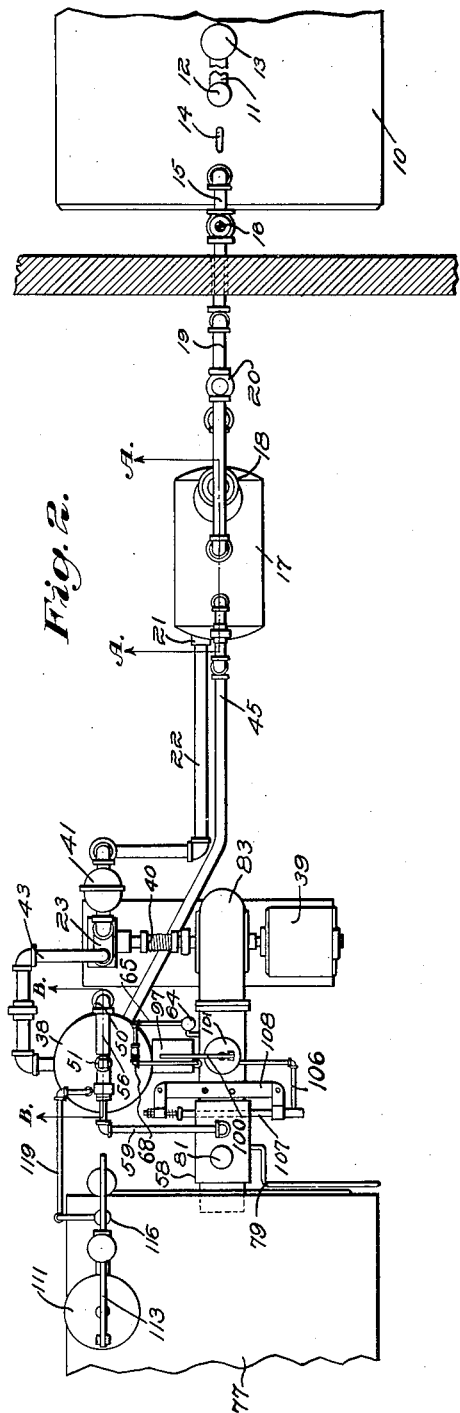
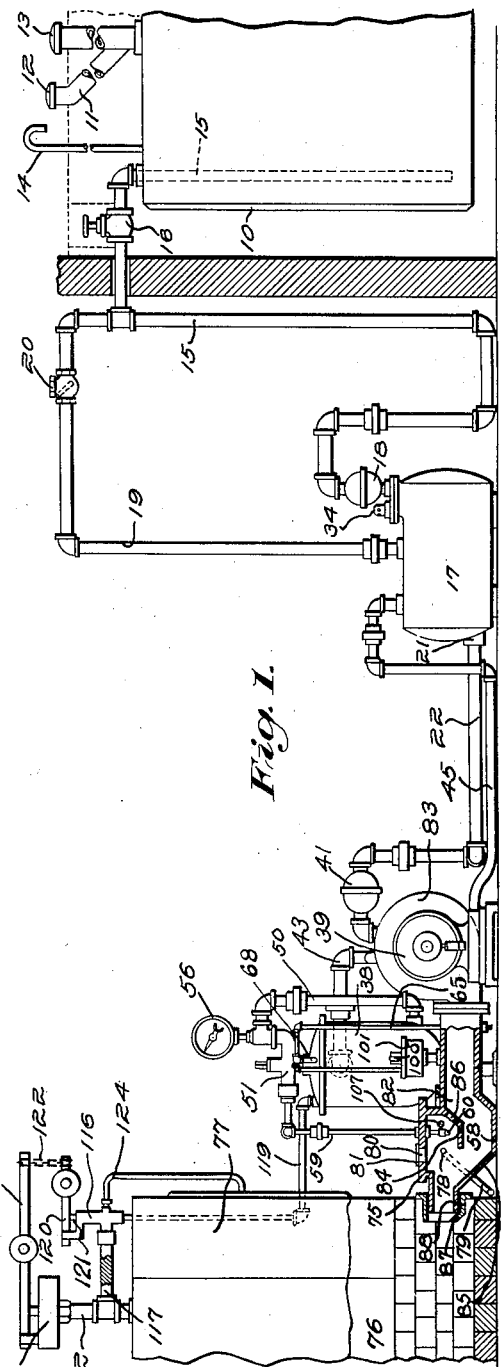
Inventor;
Nelson B. Johnson Aug. 7, 1934.　　　　N. B. JOHNSON　　　　1,969,080
LIQUID FUEL HEATING SYSTEM
Filed July 16, 1926　　　3 Sheets-Sheet 2
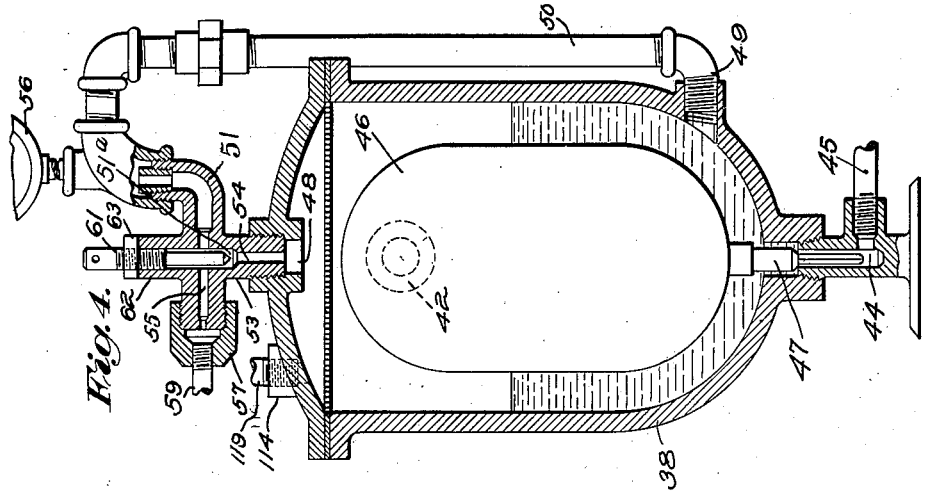
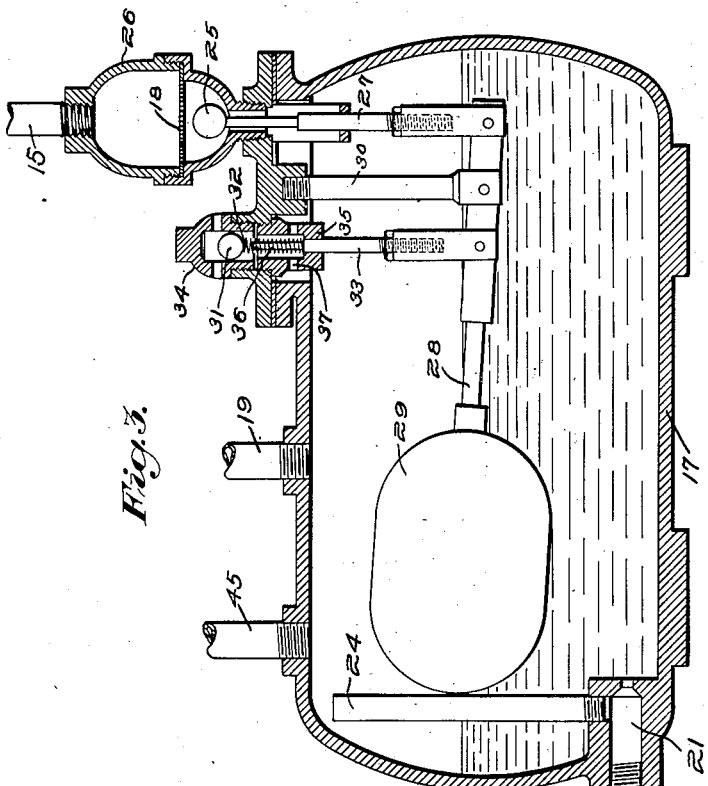
Inventor:
Nelson B. Johnson,
By Emery, Booth, Janney and Varney
Att'ys.

Aug. 7, 1934.  N. B. JOHNSON  1,969,080
LIQUID FUEL HEATING SYSTEM
Filed July 16, 1926   3 Sheets-Sheet 3
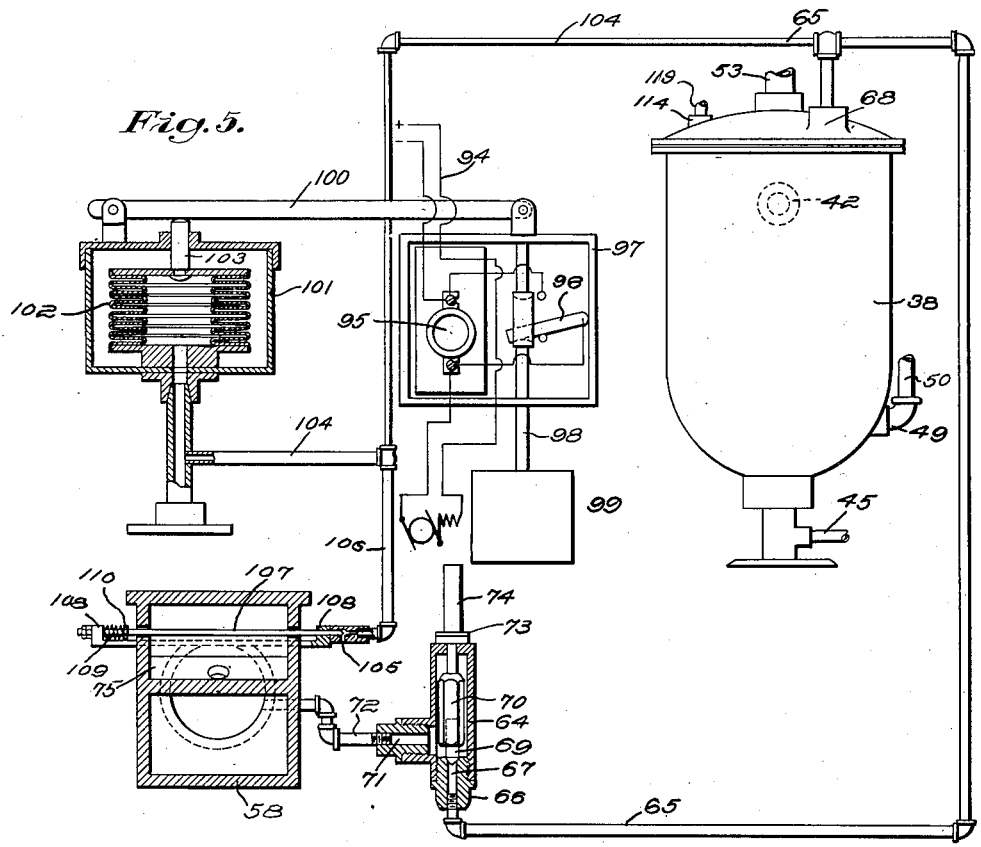
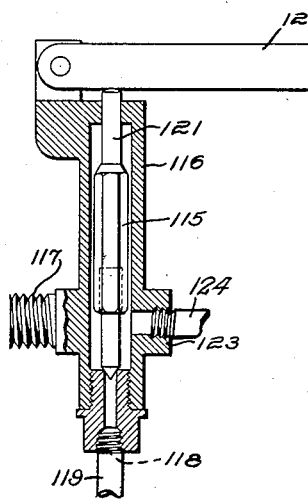
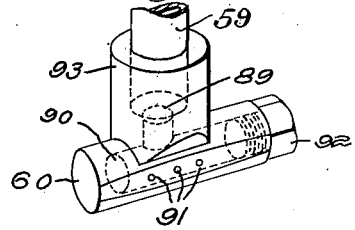
Inventor:
Nelson B. Johnson.

Patented Aug. 7, 1934

1,969,080

UNITED STATES PATENT OFFICE 1,969,080

LIQUID FUEL HEATING SYSTEM

Nelson B. Johnson, Winthrop, Mass.

Application July 16, 1926, Serial No. 122,835

18 Claims. (Cl. 158—28)

This invention relates to heating plants employing liquid fuel, and has for its object to provide an improved system, with novel methods and means for distributing, controlling and burning the same under varying conditions.

The invention will be best understood from the following description taken in connection with the accompanying drawings showing one specific embodiment thereof selected for purposes of illustration, while its scope will be indicated in the appended claims.

Referring to the drawings:—

Figure 1 is an elevation of an oil burner system and apparatus exemplifying the invention;

Fig. 2 is a plan view of the parts shown in Fig. 1;

Fig. 3, a vertical section of the vacuum tank on the line A—A of Fig. 2, looking in the direction of the arrow;

Fig. 4, a similar view of the pressure reservoir on the line B—B of Fig. 2;

Fig. 5, a diagrammatic plan view showing the relationship of parts controlling the fire at the burner, portions thereof being illustrated in section;

Fig. 6, a longitudinal section of the valve structure employed in the steam pressure control means, and Fig. 7 a perspective view of the atomizer tip.

A system of fuel supply and distribution constructed in accordance with my invention includes a main storage reservoir 10, which may be located at any convenient place, usually underground outside of the building to be heated. This reservoir has an inlet such as a pipe 11 communicating with its interior and leading from some accessible point on or near the ground surface where the fuel such as a distillate oil, is introduced through the usual filling cap 12. When local conditions require that the receiving end of the inlet pipe 11 be located at some distance from the reservoir 10, a separate inlet, such as a pipe 13 extending from the reservoir to the ground surface directly above, may be provided to permit gauging or inspecting the contents of the reservoir. As both of these inlets are normally closed at their outer ends, it is desirable to provide a vent for free communication of air at all times between the interior of the reservoir and the atmosphere due to variations in the volume of fuel in the reservoir. This vent is indicated by the pipe 14.

The contents of the reservoir are discharged through an outlet or oil supply pipe 15 communicating preferably with the interior of the reservoir through the top and extending downward therein to a point near the bottom. This pipe may optionally be provided with a manually-operated shut-off valve 16 and leads to a separate reservoir 17 of reduced dimensions, which may for convenience be designated the vacuum tank, located within the building to be heated. The position of this auxiliary or vacuum tank within the building may be arranged irrespective of the elevation of the main storage reservoir outside of the building, although the latter is herein shown at a somewhat higher elevation. Fuel thus conveyed to the tank is preferably passed through a strainer 18 (Fig. 3) of appropriate design to remove any foreign matter therein.

The force of suction induced by a partial vacuum temporarily created in the tank by means hereinafter described, is relied upon to effect a transfer of fuel through the pipe 15 from the supply reservoir to the tank. This operation of recharging the tank occurs at regular intervals, while the general system is in operation, and requires much less time than is consumed between chargings when the tank is being relieved of its contents. Consequently, when the vacuum in the tank is broken and suction ceases, the flow of fuel stops unless, as herein illustrated, the fuel in the supply reservoir assumes a higher lever than the fuel in the tank, in which case the pipe 15 then acts as a syphon and the fuel would, unless suitable preventative means were employed, continue to flow into and flood the tank. To obviate this result, air is admitted to the pipe 15 at a point of highest elevation to interfere with the action of the syphon at the instant the tank becomes fully charged, that is to say, preferably not much above half its capacity. This is accomplished by the provision of a separate pipe 19 forming an air passage between the top of the tank and the pipe 15 at its maximum elevation, said pipe 19 being fitted with an ordinary swing check-valve 20 which operates by gravity to normally close the passage in the pipe, thus preventing fuel from the supply reservoir to find a by-pass by this course to the tank, but opens to allow the passage of air from the tank to the pipe 19 when the fuel charge is completed and the vacuum broken.

An outlet 21 at or near the bottom of the tank communicates by a pipe 22 to the pump 23, a separate pipe 24 (Fig. 3) of reduced dimensions and vertically arranged within the tank leads from the outlet 21 to the air space in the top of the tank. Thus oil and air is balanced proportions are drawn off together in one operation by the force of suction induced by a single pump and conveyed thereto by the pipe 22. Fuel and air thus commingled in one conduit are drawn into the pump and thereby vigorously agitated to form an emulsion.

Owing to consumption, the quality of fuel within the tank is constantly fluctuating between high and low levels, which are automatically regulated by suitable controls, the high level being preferably not much above half the capacity of the tank, as before stated, while the low level does not descend below the top of the outlet 21, at which point when reached a new charge of fuel is drawn into the tank from the supply reservoir. An emergency ball check-valve 25 (Fig. 3) seated on the outlet at the bottom of the strainer casing 26 operates to stop the inflow of fuel and prevent flooding of the tank if other means provided for controlling the volume of the charge should fail to operate satisfactorily. The valve 25 is arranged over a vertical plunger 27 pivoted at its lower end to an arm 28 supporting at its opposite end a float 29, said arm being pivoted at an intermediate point to a fixed fulcrum 30 secured to the wall of the tank. This plunger is made adjustable lengthwise to insure a sufficient length at all times during reciprocatory movement for contacting with and maintaining the valve off its seat, except in the emergency above referred to, when the float will be elevated to such an extent that the corresponding depression of the plunger will permit the valve to seat and thus check the inflow of fuel. Under normal operative conditions, however, the volume of the fuel charge is controlled and limited by the action of a ball pop-valve 31 adapted to seat on an inlet 32 provided in the top of the tank 17, a separate adjustable plunger 33 pivoted at its lower end to the arm 28 at a point intermediate the float 29 and the fulcrum 30 being employed to unseat the valve by the elevation of the arm 28, thus admitting air to the tank and destroying the vacuum therein. The valve 31 is preferably freely enclosed in a perforate cap 34 which is detachably secured to the top of the tank and acts as a guide for the valve. The plunger 33 fits at its upper end into a dependent annular extension 35 surrounding the inlet 32 and secured to the wall of the tank, and which serves as a guide to the plunger, the upper portion of the bore being enlarged to receive a coil expansion spring 36 which surrounds the upper end of the plunger 33 and exerts upward pressure upon the valve 31. This extension 35 is provided with lateral passages 37 which afford air inlets to the interior of the tank.

As the fuel charge in the tank is being restored, the plunger 33 is gradually elevated by the float to the point of contact with the valve 31, raising it from its seat, and thus freely admitting air from the atmosphere to destroy the partial vacuum temporarily created in the tank during the charging process. The unseating of this valve is facilitated by the action of the spring 36 which immediately elevates the ball sufficiently to allow ample clearance for the inflow of air in desired volume.

Hence, the valve 31 is maintained in the open position at all times, except the comparatively brief period required for recharging, for the free admission of air to the tank in sufficient volume to meet the requirements of the system, and constitutes the sole medium by which air is inducted for any purpose.

The fuel withdrawn from the tank 17 is conveyed to a pressure reservoir 38 through the medium of the pump 23, of an approved type, the one herein shown being a rotary pump operated by an electric motor 39, their respective shafts being connected preferably by a yielding spring-coupling 40. An additional strainer 41 of conventional type and herein similar to the strainer 18, may be provided in the pipe 22 adjacent its connection with the pump for the exclusion of foreign matter.

The fuel employed in the present invention may be of any one of numerous commercial grades of distillate hydrocarbonaceous oils which are not required to be preheated to remain fluid at 0° Fahrenheit. To secure proper working consistency or fluidity, reliance is chiefly placed upon the process of emulsification which initially occurs when the air and oil are drawn off together through the pipe 22 from the tank, and then passed through the pump which vigorously agitates the mixture.

Connection between the pump and the pressure reservoir 38, which is provided in its upper portion with an inlet 42, (Fig. 4) is established by a pipe 43. When the oil collected in this reservoir exceeds a predetermined level, which may be fixed preferably at somewhat more than half its capacity, any excess is carried off by means of an outlet 44 at the bottom which communicates with an inlet located in the upper portion of the tank 17 by means of a pipe 45, said outlet being controlled by a float 46 mounted on a valve 47 normally seated on the outlet.

The air and oil forced into the reservoir 38 are held under pressure, the air collecting in the top and finding a main vent through an outlet 48 therein while the oil is released through a separate outlet 49 near the bottom of the reservoir and is forced upward under the pressure of air within the reservoir through a pipe 50 leading therefrom to an arm 51 mounted preferably on the top of the reservoir and having an interior passage-way 51a adapted to serve as a mixing chamber, said arm being provided with a depending branch 53 screwed into the outlet 48 and having a bore 54 communicating with the mixing chamber. The oil pipe 50 may be provided at a convenient point with a pressure gauge 56.

The oil and air thus reunited in the chamber 52 commingle in regulated proportions to form an emulsion which is conveyed through a reduced outlet 55 in the nozzle 57 to the burner 58 by means of a pipe 59, which is provided at its outlet end with an atomizer 60.

To regulate the amount of fuel released to the atomizer, suitable control means are provided in the form of a threaded stem member 61 adjustably mounted in an arm 62 provided on the mixing chamber opposite the arm 53, said arm 62 having a threaded bore arranged in alignment with the passage 54 which forms a seat for the stem member.

The exposed upper end of the stem member 62 carries a lock nut 63 which may be tightened when proper adjustment of the stem member is accomplished. By making the size of the outlet 55 somewhat smaller than the air inlet passage 54 the pressure of air supplied to the mixing chamber is maintained therein. A slight turning movement actuating the stem member toward or away from its seat and thus controlling the inflow of air will effectually retard or increase the flow of oil as conditions require. The pressure of air admitted to the mixing chamber is adequate and solely relied upon to control the pressure of oil therein as both elements are subject to like pressure from the reservoir, while the weight of oil within the pipe 50 tends to retard its flow and to reverse the course of movement, the oil returning to the reservoir when the air pressure within the reservoir is reduced to approximately atmospheric conditions. By the same means flooding of the burner at the atomizer is obviated, while the possibility of clogging and changing the fire, as occurs when needle point valves or other sensitively adjusted passages are used, is eliminated.

It should be pointed out that the stem member 61 is employed solely for the purpose of controlling the air inlet to the mixing chamber and that the oil inlet is affected thereby only indirectly and in proportion to the extent of the resulting air pressure. No means other than air pressure is necessary to check the inflow of oil. Consequently no positively acting means are required, as in the case of an ordinary needle valve, to shut off the oil supply or to prevent seepage when the system is not in operation. Moreover, in the present instance, throttling of the air inlet to the mixing chamber has the effect of increasing the fire.

To maintain a uniform working pressure of air within the reservoir 38, a condition essential to the control of the fuel supply and fire at the burner, suitable means are provided to automatically relieve any excess pressure which would tend to disturb the desired regulation of these functions. To this end I provide a valve comprising preferably an upright tubular casing 64 (Fig. 5) closed at both ends and communicating with the reservoir 38 by means of a pipe 65, one end of said pipe being connected to a removable plug 66 fitted in the lower end of the casing 64 and having a bore 67 therethrough, and the opposite end of the pipe being connected to an outlet 68 provided in the upper portion of the reservoir. The upper end of said bore 67 forms a seat for the lower end 69 of a plunger 70 enclosed in the casing, said plunger being normally seated by gravity to close the bore 67 but free to rise under excess pressure of air within the reservoir and allowing air to escape through a lateral port 71 communicating by a pipe 72 with the interior of the burner 58. The action of the plunger 70 may be accurately controlled by means of small removable weights, herein shown in the form of one or more washers 73 carried on the upper end of a rod 74 extending from the upper end of the plunger 70 through and beyond an opening in the top of the casing.

The lower end or seating portion 69 of the plunger is preferably formed as a separate element freely fitting into a suitable socket in the bottom of the plunger, thereby being susceptible of a limited independent movement adapted for self adjustment in seating.

The burner 58 (Figs. 1, 2) herein shown is a hollow casting having a longitudinally extended formation and open at both ends. The interior is divided into two compartments, one above the other. The upper compartment, which may be designated the retort chamber 75, and is horizontal, is closed at the rear end and extends at its forward end and opens into the fire box 76 of the furnace 77. Within the retort chamber 75 and in the rear end thereof is arranged the atomizer 60 carried on the fuel pipe 59 extending through a suitable opening in the top of the burner. Adjacent the atomizer is arranged a pilot light 78 which may be of any approved type and either gas or electric, the form herein selected being a gas light, supplied from a pipe 79 extending through the wall of the burner and communicating with a suitable gas supply. A separate opening 80, normally closed by a removable cover 81, is preferably provided in the top of the burner conveniently arranged for the purpose of inspecting the interior of the burner. The lower compartment 82 of the burner extends rearward to and communicates with a blower 83 of any approved type mounted upon the motor shaft, the forward end of said compartment passing under and around a divisional wall 84 forming a portion of the structure of the burner and separating the upper and lower compartments, said wall being subjoined to and forming an angularly arranged forward extension of the rear wall of the retort compartment, assuming a downward and forward course and terminating at an intermediate point in the length of the retort chamber and leaving an opening commensurate with the full width of the burner for the passage of air from the lower compartment into the forward end of the upper compartment and thence to the fire box. The structural wall 85 forming the front end of the lower compartment is arranged at an upward inclination best adapted to direct the course of the air conveyed from the blower into the retort chamber at a point most effective for oxidation and preliminary combustion of the fuel vapor. A relatively slight opening 86 may be provided in the downwardly inclined portion of the divisional wall 84 between the two compartments to permit the passage of a small amount of air direct to the atomizer to supply the requisite amount of oxygen required at this point and to obviate any tendency of the air and gases to become pocketed here.

The combustible vapors formed or ignited in the retort chamber are thoroughly oxidized in their passage from and beyond this chamber by the ample volume of air supplied from the blower and projected at suitable velocity for proper mixture of vapor into the fire box of the furnace where any remaining particles of liquid fuel failing to vaporize and carried in suspension are fully consumed by the intensity of the surrounding combustion. An upward course to the burning gases within the fire box may be facilitated by the provision of an upwardly inclined lip 87 on the bed plate 88 supporting the burner.

The atomizer 60, which may be of any approved design, is herein shown (Fig. 7) as a unitary structure comprising a cylindrical body portion having a closed interior chamber 90 therein provided with one or more lateral orifices 91 arranged to face toward the front of the burner. Said body portion may be provided at one end with a normally closed opening fitted with a screw-threaded plug 92, which may be removed to allow inspection and cleaning of the interior. The atomizer is secured to the pipe 59 by means of a suitable interiorly threaded extension member 93 provided on the top of the body portion, the bore therein having a reduced portion 89 forming an inlet to the chamber 90.

The electric current, carried by supply wires 94, to operate the motor 39 is passed through a safety shut-off fuse 95 or time delayed circuit interrupter (Fig. 5) of any approved form and adapted to open the circuit after a predetermined brief period of operation, as for example two to three minutes. To avoid opening of the circuit after so brief an interval during normal operative conditions, it is necessary to provide automatic control means to shunt the circuit around the fuse. This I accomplish by the provision of a switch, such as a single pole lever-switch 96 mounted in a suitable receptacle 97 in which the fuse 95 may also be placed, said receptacle being arranged at any convenient point and herein shown adjacent the burner. The switch lever is pivotally secured to and actuated by an upright arm 98 carrying at its lower end a weight 99 and pivoted at its upper end to one end of a horizontally arranged arm 100 fulcrumed at its opposite end to the top of a separate closed receptacle 101 herein mounted on the burner and containing a bellows 102 carrying an upward extension member 103 extending through a suitable opening in the top of the receptacle and engaging the arm 100 intermediate the fulcrum and the weight arm. Said bellows has an opening in its bottom communicating by a pipe 104 with the air outlet 68 of the pressure reservoir 38. When sufficient pressure has been generated in the reservoir 38 by the action of the pump 23, which occurs after a comparatively brief interval of operation and less than the time required to blow the fuse 95, after the burner has been started, the air is forced from the reservoir 38 to the bellows which raises the arm 100, thereby elevating the lever 98 against the opposition of the weight 99, which normally maintains the switch 96 in the open position, and closing the switch which in turn shunts the electric current out of the path of the fuse, thus preventing the cutting off of the current supply. Hence, if the supply of fuel is exhausted or for any other cause the pump or other parts of the system are in operation and the requisite air pressure is not generated in the reservoir 38, the electric current is shut off by the blowing of the fuse and the motor 39 thereupon ceases to operate.

While the air control valve at 64 is adapted to equalize pressure within the reservoir 38, relieving all in excess of requirements for operating the burner and the bellows 102, it is necessary to further provide emergency means for stopping the motor in case the burner for any reason should cease firing, as for example failure of ignition when the system is automatically started, or of the fuel supply or interruptions thereof due to clogging, in which cases the pump would still continue to force air into the reservoir 38 thereby maintaining the requisite pressure to operate both said control valve and the bellows. To this end I provide a vent 105 in the pipe 104 by means of a branch extension thereof 106 carried to a point adjacent the burner (see Fig. 5). Said vent is laterally provided in the lower end of said extension pipe near the outlet thereof which is open and arranged to receive one end of an expansion rod 107 of selected metal readily susceptible to thermal changes, said rod being arranged to extend into the interior of the burner preferably near the atomizer and projecting at opposite ends through suitable openings in the side walls beyond the same, said outer ends being supported by a bracket 108 secured to the exterior of the burner. The forward end of the rod extending into the pipe 106 operates under expansion if proper ignition occurs and after the burner has been operated for a less period of time than is required to blow the fuse, to close the vent 105 while the burner is in operation, movement of the rod rearward being yieldingly opposed by a coil spring 109 carried thereon between the corresponding bracket arm and a lock nut 110. If, therefore, the fire subsides for any cause while the remainder of the system continues to operate, the rod 107 contracts, thus opening the vent 105, and thereby relieving the bellows of all pressure, as the air escapes therefrom more rapidly than it is supplied from the pressure reservoir, due preferably to the reduced size in that portion of the pipe 104 between its points of connection with the extension pipe 106 and the pressure reservoir. This resulting contraction of the bellows causes the position of the switch 96 to be reversed for a sufficient length of time to involve blowing of the fuse 95 and opening of the electric circuit.

The invention is adaptable to any of the usual forms of heating furnaces whether employing steam, hot-water, vapor, or hot-air. Appropriate auxiliary thermal control means cooperatively associated with and suitably incorporated in the system may be employed to insure interruptions in the operation of the system whenever the maximum heating temperature is exceeded. This may be accomplished in various ways, the means herein shown being illustrative of the manner in which the invention may be adapted to and automatically controlled by a steam or vapor boiler. The boiler 77 is provided with an approved type of expansion diaphragm 111 operating either under the influence of heat or pressure of steam conveyed thereto by a pipe 112 communicating with the boiler to lift the weighted arm 113 mounted and operating in the usual manner. But whereas such elevation of the arm 113 is made effective with the ordinary methods of firing from coal and the like fuels to open or close dampers to reduce the fire, I employ the same to open an outlet 114 provided in the air portion of the pressure reservoir 38 to reduce the pressure of air therein. This may be accomplished by the provision of a gravity valve 115 (see Fig. 6), similar in general construction and operation to the valve 70 hereinbefore described. Said valve 115 is enclosed in a casing 116, preferably supported by a lateral bracket arm 117 secured to any convenient point of support, such as the pipe 112, and communicates through an inlet 118 at the lower end by a pipe 119 with said outlet 114 of the pressure chamber. Said valve 115 is normally held in the seating position on the inlet 118 under pressure of a weighted arm 120 pivoted at one end to the top of the casing 116 and exerting a predetermined downward pressure on an extension member 121 provided on the upper end of the valve and extending through a suitable opening in the top of the casing, the elevation of the casing arm with the consequent release to a corresponding extent of the valve being effected by a suitable positively acting connection, such as a chain 122, arranged between the outer end of said casing arm and the arm 113 which is actuated by the diaphragm. When the valve is thus opened air from the pressure reservoir 38 escapes through a lateral port 123 provided in the casing 116, being preferably conveyed by a pipe 124 to the interior of the furnace. The sudden release of pressure in the reservoir 38 by this means reacts in the manner above described to shut off the supply of fuel to the burner and consequently to reduce the head of steam in the boiler. When the latter is reduced to a predetermined extent, that is to say, when it becomes insufficient to keep the valve 115 in the open position, pressure is again resumed in the pressure reservoir and the supply of fuel to the burner restored.

The parts of the system above described are so coordinated that their several functions are performed without sudden or violent starting or stopping. The fire at the boiler is automatically increased or diminished as conditions require and the system continues to operate in this manner indefinitely to maintain the desired steam pressure. A thermostat may be employed to regulate these operations in the usual manner. Where a different form of heat is used, such as hot water or hot-air, suitable modifications in controls may be employed for operating the fuse switch 96 in the electric circuit. In the present invention leakage of oil at any point in the system is obviated during periods when the system is not in operation. This is accomplished by keeping the oil away from the valve seats by maintaining the oil levels in the reservoirs at such times below the maximum elevation of all fuel carrying connections in the manner hereinbefore described.

Having thus described one embodiment of my invention, but without limiting myself thereto, what I claim and desire to secure by Letters Patent is:

1. In a liquid-fuel heating system, a container having a fuel inlet, a separate air inlet, a common constantly-open outlet for fuel and air together, a suction pump in communication with said common outlet for withdrawing a mixture of fuel and air through said outlet and also for creating a vacuum in said container by way of said outlet for recharging said container with fuel and automatic control means for regulating the intake of fuel and air into the container, including a valve for closing the air inlet during the process of recharging the container with fuel, and a float within the container for actuating the valve.

2. In a liquid-fuel heating system, a container having a fuel inlet, a separate air inlet, an outlet for fuel and air, a valve for closing the air inlet when the container is being charged with fuel, and means including a float within the container for maintaining the valve normally in the opening position, and a separate valve controlled by said float for closing the fuel inlet when the container is overcharged with fuel.

3. In a liquid-fuel heating system, in combination with a fuel supply, a chamber having a fuel inlet, a separate air inlet, a constantly-open outlet for fuel and air, a suction pump for withdrawing fuel and air together through said outlet and also for creating a vacuum in said chamber, a valve for closing the air inlet when the container is being recharged with fuel, a float within the chamber for controlling the valve, a siphonic fuel carrying connection between the fuel supply and said fuel inlet, means providing for direct air communication between the air space in said chamber and a point of maximum elevation in said siphonic fuel carrying connection, and means for preventing the discharge of fuel therethrough into said chamber.

4. In a liquid-fuel heating system, in combination, a burner, a source of fuel supply including a reservoir having an air space therein and fuel and air outlets, means for forcing fuel and air into the reservoir and maintaining an air pressure therein, including a pump, an electric motor for operating the pump, a source of current supply and current carrying connections communicating with said motor.

5. In a liquid-fuel heating-system, in combination, a burner, a source of fuel supply, fuel-carrying connections for conveying the fuel from the source of supply to the burner, a pump, an electric motor for operating the pump, a pressure chamber for receiving fuel and air, said pump being operable to force fuel and air into said chamber, and to maintain air pressure therein, a source of electric current and current supply connections for conveying current to the motor, and automatic control means cooperatively associated with said burner and said pressure reservoir operable to cut off the supply of electric current to stop the operation of said system including a bellows having an air inlet communicating with the air space in said reservoir and an arm adapted to be actuated by the movements of the bellows, a fuse and a switch arranged in the electric circuit, said switch being operable to shunt the current out of the path of the fuse while said system is in operation, means cooperatively associated with said bellows arm and said switch for throwing the switch when the bellows are deflated, and control means cooperatively associated with the burner to deflate the bellows when the burner is inoperative, including an air conduit opening at one end into said bellows and having a port at its opposite end, a heat-expansion rod arranged in said burner in position to be influenced by fire therein and extending beyond the burner, such outward extension of said rod being arranged to close the port in said air conduit when the burner is in normal operation and to open the said port when the burner ceases to operate.

6. In a liquid fuel burning system, the combination of a burner, motor-operated means to supply liquid fuel under air pressure to said burner, and means to stop the delivery of oil to said burner comprising pneumatic means operated by the pressure of the air on the fuel and influenced by the temperature at the burner to stop the motor.

7. In a liquid fuel burning system, the combination of a burner, a tank containing air under pressure and liquid fuel under said air pressure having a fuel pipe communicating with the fuel and air spaces in said tank and with said burner and arranged to deliver a mixture of fuel and air to said burner, a pump supplying said tank with air and fuel under pressure, and pneumatic means responsive to a low temperature of the burner and actuated by the air pressure in said tank to stop said pump.

8. In a liquid fuel burning system, the combination of a burner, a tank containing air and liquid fuel under air pressure supplying a mixture of air and fuel to said burner, a pumping apparatus for supplying said tank with a mixture of air and liquid fuel, pneumatically operated means normally under the air pressure in said tank arranged to render said pump ineffective, and thermo-responsive means located at said burner and influenced by a low temperature thereof to reduce the air pressure on and thereby effect the operation of said pneumatically-operated means.

9. In a liquid fuel burning system, the combination of a burner, a tank containing liquid fuel under air pressure supplying oil to said burner, a pumping apparatus including an electric motor supplying said tank with air and liquid fuel, a time-delayed circuit interrupter in the motor circuit operable on continued motor operation for a predetermined time to interrupt the motor circuit and stop the motor, and pressure-influenced means normally operable by the air pressure in said tank within the time-delay period of said circuit-interrupter to prevent the operation thereof.

10. In a liquid fuel burning system, the combination of a burner, a tank containing liquid fuel under air pressure supplying oil to said burner, a pumping apparatus including an electric motor supplying said tank with air and liquid fuel and air, a time-delayed circuit-interrupter in the motor circuit operable on continued motor-operation for a predetermined time to interrupt the motor circuit and stop the motor, and a pressure-operated switch arranged to short circuit said circuit-interrupter when there is a predetermined air pressure in said tank, said pumping apparatus arranged normally to build up such predetermined air pressure within the time-delay period of said circuit-interrupter.

11. In a liquid fuel burning system, the combination of a burner, a tank containing liquid fuel under air pressure supplying oil to said burner, a pumping apparatus including an electric motor supplying said tank with air and liquid fuel and air, a time-delayed circuit-interrupter in the motor circuit operable on continued motor operation for a predetermined time to interrupt the motor circuit and stop the motor, pressure-influenced means normally operable by the air pressure in said tank within the time delay period of said circuit-interrupter to prevent the operation thereof, and means governed by the failure of fuel to burn in said burner to render said pressure-influenced means ineffective, whereby to permit said circuit-interrupter to operate and stop said pumping apparatus.

12. In a liquid fuel burning system, the combination of a vacuum tank, a pressure tank, a pump located between said tanks arranged to create a vaccum in said vacuum tank and a pressure in said pressure tank, automatically-operative, fuel-level governed means to break the vacuum in said vacuum tank and stop the flow of liquid fuel only thereinto, means associated with said vacuum tank to deliver separately air and liquid fuel thereto, other means associated with said vacuum tank to deliver a mixture of air and liquid fuel from said tank to said pump, said pump operable to force said mixture under pressure into said pressure tank, wherein the air and liquid fuel separate, means associated with said pressure tank and including a discharge pipe therefrom admitting air and liquid fuel from said tank into the entrance of said pipe, and a remotely located burner receiving the mixture of air and liquid fuel from the exit of said pipe.

13. In combination, an oil-air mixing pump, oil-air containing means having a sole air inlet, said pump communicating with said containing means for withdrawing air and oil therefrom, oil level controlled means in said containing means for controlling said air inlet, and an oil supply removed from said containing means and communicating therewith for supplying oil under suction thereto during the action of the pump when said air inlet is closed.

14. In an oil burner, a tank having a single chamber, a pump in communication with the tank so that it will perform a suction on the fluid contents of the tank, a valve structure associated with the tank communicating with an oil storage tank and with the outside air, and a single actuator functioning as a double valve being movable into either of two positions respectively to admit atmospheric air or oil from the storage tank to be drawn out of the tank as a mixture by the pump.

15. In an oil burner, a valve structure having air and oil inlets, a single actuator for controlling said inlets, a single tank with which the valve structure has connection, a pump also in connection with the tank to draw on its fluid contents, and means following the level of the oil and being in connection with said single actuator to arrange the settings of said actuator for the sequential influx of air and oil depending upon the quantity of each in the tank.

16. In a liquid fuel burner, a tank having fuel and air inlets, a common outlet for fuel and air in mixture, automatic control means for regulating the intake of fuel and air into the tank, including a valve for closing the air inlet and opening the oil inlet and vice versa, a float within the tank for actuating the valve, and an oil and air mixing pump connected to said common outlet.

17. In a liquid fuel burner, a tank having a single chamber, a pump in communication with said chamber for withdrawing a mixture of oil and air, oil and air inlets to the chamber, and a float-valve structure for sequentially opening and closing the inlets.

18. In an oil burner, a tank having a single chamber, a pump in communication with the tank so that it will perform a suction on the fluid contents of the tank, a valve structure associated with the tank communicating with an oil storage tank and with the outside air, and a single actuator functioning as a double valve being sequentially movable into any of various positions respectively to admit atmospheric air or oil from the storage tank or both, to be drawn out of the tank as a mixture by the pump.

NELSON B. JOHNSON.

Certificate of Correction

Patent No. 1,969,080. August 7, 1934.

NELSON B. JOHNSON

It is hereby certified that error appears in the printed specification of the above numbered patent requiring correction as follows: Page 5, second column, line 89, claim 4, after the word "motor" and before the period insert the following—

*thermostatic control means associated with the burner operable to reduce the air pressure in said reservoir, a switch for controlling the supply of current to said motor, and pressure responsive means cooperatively associated with said reservoir and said thermostatic control means for actuating said switch to open the circuit when the pressure in said reservoir is reduced* and that the said Letters Patent should be read with this correction therein that the same may conform to the record of the case in the Patent Office.

Signed and sealed this 5th day of October, A. D. 1948.

[SEAL]

THOMAS F. MURPHY,
*Assistant Commissioner of Patents.*